United States Patent [19]

Clauer et al.

[11] 4,401,477
[45] Aug. 30, 1983

[54] LASER SHOCK PROCESSING

[75] Inventors: Allan H. Clauer, Worthington; Barry P. Fairand, Arlington; Stephen C. Ford, Worthington; Craig T. Walters, Arlington, all of Ohio

[73] Assignee: Battelle Development Corporation, Columbus, Ohio

[21] Appl. No.: 378,975

[22] Filed: May 17, 1982

[51] Int. Cl.³ .............................................. C21D 7/00
[52] U.S. Cl. .......................................... 148/4; 148/1; 219/121 L
[58] Field of Search ................. 148/1, 4; 219/121 LZ, 219/121 LF, 121 L, 121 LQ

[56] References Cited

U.S. PATENT DOCUMENTS 3,218,199  11/1965  Cowan et al. ........................... 148/4
3,850,698  11/1974  Mallozzi et al. ......................... 148/1

OTHER PUBLICATIONS

AFWAL-TR-80-3001, vol. II., Investigation of Laser Shock Processing, Ford et al., Aug. 1980, pp. 1-2 & 96-100.

*Primary Examiner*—L. Dewayne Rutledge
*Assistant Examiner*—Scott Kastler
*Attorney, Agent, or Firm*—Barry S. Bissell

[57] ABSTRACT

An improved method and an apparatus for altering properties in a solid target by using the radiation emitted by a high power pulsed laser to generate a short duration, high amplitude pressure pulse is directed at the front side of solid target to alter material properties. The front side of the solid target is covered with an overlay material that is transparent to laser light, and the back side is placed in direct contact with a trapping material having substantially the same acoustical impedance as the metal substrate. When the solid target is processed by the pulsed laser, the microstructure and the stress state of the target are altered in a predictable manner.

1 Claim, 1 Drawing Figure

LASER SHOCK PROCESSING

FIELD OF THE INVENTION

This invention pertains to an improved method and apparatus for the laser shock processing of a solid target with a high power pulsed laser so as to alter the microstructure of the target thereby improving the residual stress of the target, in a controlled manner.

BACKGROUND OF THE INVENTION

Using high power lasers to improve material properties is one of the most important industrial applications of lasers. Lasers can transmit controllable beams of high energy radiation for metalworking. Primarily, the laser can generate a high power density that is localized and controllable over a small area. This allows for cost effective and efficient energy utilization, minimizes distortions in surrounding areas, and simplifies material handling. Since the laser pulse involves the application of high power in short time intervals, the process is adaptable to high speed manufacturing. The fact that the beam can be controlled and focused, allows parts having complex shapes to be processed. Also accuracy, consistency, and repeatability are inherent to the system.

Improving the strength of metals by cold working undoubtedly was discovered early in civilization, as ancient man hammered out his weapons and tools. Shot peening has been used as a means to improve the fatigue properties of metals. Another method of shock processing involves the use of high explosive materials in contact with the metal surface.

Copending patent application Ser. No. 334,612 discloses the use of a split beam to simultaneously laser shock the opposing two sides of the target material. However, the split beam method has several inherent disadvantages. 1. To shock process two sides simultaneously requires that the laser generate twice the power as for only doing one side. High powered lasers are extremely expensive and such cost may be prohibitive. 2. The split beam method requires the use of precisely calibrated and positioned lenses and mirrors. This precision may be difficult to achieve in a high production manufacturing environment. 3. In many applications only one side of the metal substrate is subject to fatigue, so there is no need to use the split beam method. In other applications, it is not possible to have line of sight access to both sides of the fatigue critical region for split beam processing.

The object of this invention is to provide an effective method of shock processing metal substrates from one side only with high pressure laser pulses of short duration.

SUMMARY OF THE INVENTION

The present invention constitutes an improvement of the U.S. Pat. No. 3,850,698 which is the basic method of laser shock processing a solid target with a radiation pulse of high power generation, the disclosure of which is herein incorporated by reference. The patented invention is particularly useful when the target material is sufficiently thick so that the stress wave does not penetrate to the back surface of the target material.

The present invention involves the mounting of a trapping material (hereinafter referred to as a momentum trap) that is placed along the back surface of the metal substrate to be laser shock processed. It is important that the trap and the substrate have substantially the same acoustical impedance. Other material properties that are important are a matching of material densities, and sound speed. Preferably, the trap and the substrate are the same material, so that no matching is needed.

The trap is placed against the back surface of the substrate, and mineral oil can be used therebetween to enhance the coupling of the materials. A spring-loaded, disk-shaped trapping material is placed against the substrate. An overlay material that is substantially transparent to laser radiation (e.g.—fused quartz, acrylic, water) is placed in direct contact with the front surface of the specimen. Initially the specimen is coated with a thin layer of paint, preferably black, to enhance absorption of the laser radiation and to protect the surface from melting by the radiation. A high power, pulsed laser emits a high intensity pulse of short duration radiation that passes through the overlay material, is absorbed by the paint, produces a high pressure condition at the front surface of the metal substrate, thereby driving a high amplitude stress wave into and through the metal substrate and into the momentum trap. The surface of the paint is vaporized when it is struck by the laser radiation causing an extremely high pressure near the surface when the vaporized gas is trapped between the specimen surface and the transparent overlay. At the back surface of the target specimen the stress wave passes into the momentum trap and is reflected back from the back surfaces. However, the momentum imparted to the trap by the reflected wave causes the spring loaded trap to break away and disconnect from the specimen after the stress wave is reflected from the back surface of the momentum trap and strike the common surface of the specimen and the trap. The momentum trap thereby carries away the tensile wave which would produce distortion in the specimen.

Another means of absorbing the stress wave after it has passed through the metal substrate involves the use of a large mass of material, having a long dimension in the same direction as the stress wave, and having substantially the same acoustical impedance as the metal substrate. Being in direct contact with the metal substrate, and mounted so that the stress wave passes through the long dimension of the material mass, the stress wave is considerably weakened when it is reflected back to the common surface of the mass and the substrate.

DETAILED DESCRIPTION

Figure 1:
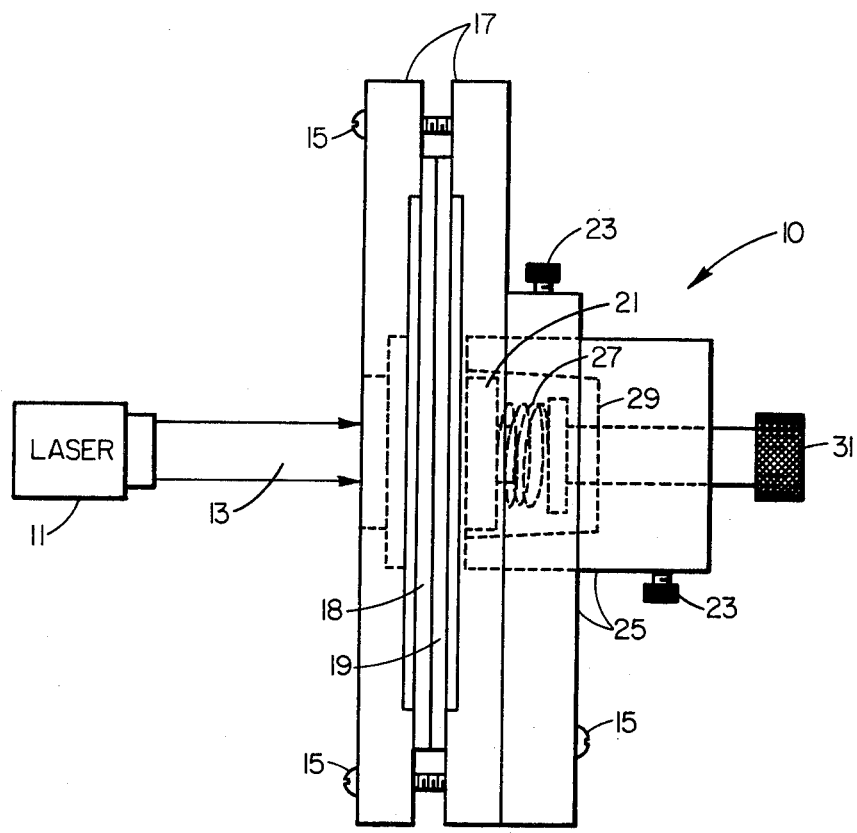
FIG. 1 is a side view of the specimen mounting frame which includes the momentum trap.

FIG. 1 illustrates the apparatus 10 used in the experiments, according to the present invention. A six stage CGE neodymium glass laser 11 which emits a 200 J beam 13. Laser irradiations were conducted with an eight stage laser system operating in a 30 ns pulse length mode.

The metal specimen 19 is mounted in specimen frame 17 along with an overlay material 18 that is transparent to laser radiation, and secured by four mounting screws 15. The momentum trap 21 is a cylindrical disk located directly behind the specimen 19. Mineral oil (not shown) may be used to couple the momentum trap 21 to the specimen 19. A plunger frame 25 along with mounting bolts 23 is attached to the specimen frame 17. A plunger 31 is centered in the plunger frame 25 and is affixed by a springing means 27 to the momentum trap 21. A disk catcher 29 having a slightly conical tapered hole is also centered in the plunger frame 25, and ensures that the momentum trap 21 will not slap back onto the back of the specimen 19.

Laser shock processing is applicable to a wide range of metals and alloys of steel and aluminum. Previous tests have demonstrated significant improvements involving AISI 4340 steel and similar materials. Experiments invovling the present invention utilized 2024-T3, an aluminum alloy and a momentum trap made of the same material.

A 2024-T351 material was received as 0.25 inch plate. The T351 condition signified a solution treatment followed by a light roll-leveling pass which introduces a deformation of from one to two percent, with natural aging at ambient temperature.

For fatigue testing, a 3/16 inch diameter hole was centered into each specimen, and two narrow notches were electrodischarge machined into the opposed sides of the notch, one on each side, to act as crack initiation sites.

Residual Stress

For residual stress testing, twelve plate-type specimens (4×4×0.25 inch) were machined, and a 0.187 inch diameter hole was drilled through the plate to simulate a fastener hole. The surface was spray painted with metal primer and flat black paint as an opaque overlay for laser beam absorption. The transparent overlay materials were 1½ inch diameter by ⅛ inch thick fused quartz or acrylic plastic disks with optical quality surfaces on both sides. The disks were pressed snugly against the painted surface by a clamping ring secured to the specimen frame with mounting screws.

All specimens were 2024-T3 aluminum, were irradiated with a 1.63 cm beam diameter, and utilized a fused quartz overlay. Specimen SB-RS1 employed split beam simultaneous irradiation. Specimen OS-RS1 employed one-sided irradiation.

Specimen MR-RS1 utilized a momentum trap, and the unirradiated surface was backed up with a spring loaded 2024-T3 aluminum disk (1 inch diameter × ¼ inch thick). The ¼ inch trap thickness is adequate to carry away all of the shock wave. For example, assuming the stress wave is not more than 200 n sec in duration and the sound speed in aluminum does not exceed $5 \times 10^5$ cm/sec, the maximum length of the stress wave would be $(200 \times 10^{-9} \text{ sec}) \times (5 \times 10^5 \text{ cm/sec}) = 1$ mm $= 0.04$ inch. Mineral oil was used to couple the disk to the specimen, and a tapered cone "disk catcher" was used to ensure that momentum trapping had occurred (the disk would not slap back onto the back of the specimen). Both the front and back surfaces received separate irradiations. Before taking the second shot in the sequence, it was necessary to sand flat the crater effects created on the first surface, so that the trap for the second irradiation could be coupled into this surface.

TABLE 1

| | | | | | | |
|---|---|---|---|---|---|---|
| LASER SHOCK PROCESSING FOR RESIDUAL STRESS | | | | | | |
| Specimen Number | Hole Diameter (cm) | Average Fluence (J/cm$^2$) | | Pulse Width (ns) | Peak Power Density (× 10$^9$ W/cm$^2$) | |
| | | Side 1 | Side 2 | | Side 1 | Side 2 |
| SB-RS1 | None | ~78 | ~78 | 13 | ~6.0 | ~6.0 |
| OS-RS1 | None | ~70 | ~70 | ~13 | ~5.4 | ~5.4 |
| MT-RS1 | 0.48 | 82 | 82 | 23/26[a] | 3.6 | 3.2 |

[a] side 1/side 2

Compressive stresses were produced on both sides of the specimen by the successive shocking procedure. As can be seen from the following Table 2, the in-depth stress profiles of the first and second sides shocked are almost identical, except for the surface stress.

TABLE 2
RESIDUAL STRESSES ON BOTH SIDES OF A CONSECUTIVELY SHOCKED, MOMENTUM TRAPPED SPECIMEN. (SPECIMEN MT-RS1)

| First Side Shocked | | Second Side Shocked | |
|---|---|---|---|
| Depth Below Surface, (inch) | Residual Stress, (ksi) | Depth Below Surface, (inch) | Residual Stress, (ksi) |
| 0.000 | −39.3 | 0.000 | −43.9 |
| 0.002 | −35.3 | 0.003 | −33.6 |
| 0.009 | −30.8 | 0.007 | −33.3 |
| 0.014 | −32.2 | 0.012 | −23.6 |
| 0.018 | −26.9 | 0.018 | −26.0 |
| 0.028 | −17.4 | 0.028 | −18.8 |

Other specimens were tested to evaluate laser shocking an unsupported sample (no trapping material) from one side only. The residual stresses were measured at three separate locations: (G) a location as the geometric center of the beam on the specimen surface, (H) a location halfway between (G) and the edge of the beam and (I) a location just outside the circumference of the beam. The residual stress results are listed in the following table:

TABLE 3
RESIDUAL STRESS RESULTS FOR SPECIMENS WITHOUT A DRILLED HOLE, FUSED QUARTZ OVERLAY

| Specimen Number | Power Density, (W/cm$^2$) | Depth Below Surface, (inch) | Residual Stress, ksi Location | | |
|---|---|---|---|---|---|
| | | | G | H | I |
| SB-RS1 | Split Beam 6.0, 6.0 × 10$^9$ | 0.000 | −43.9 | −55.0 | 42.1 |
| | | 0.002 | −40.9 | −50.5 | 7.8 |
| | | 0.008 | −32.6 | −33.7 | −4.2 |
| | | 0.013 | −31.2 | −30.8 | −11.3 |
| | | 0.022 | −24.0 | −22.5 | −9.6 |
| | | 0.033 | −16.2 | −16.5 | −12.4 |
| | | 0.042 | −10.7 | −12.9 | −6.1 |
| | | Laser Shocked Side | | | |
| OS-RS1 | One Side 5.4 × 10$^9$ | 0.000 | 0.3 | −15.0 | 0.8 |
| | | 0.002 | −3.1 | −12.8 | 4.2 |
| | | 0.007 | −2.2 | −8.8 | −22.0 |
| | | 0.013 | 1.0 | −2.4 | −19.6 |
| | | 0.022 | −4.9 | −2.2 | −9.8 |
| | | 0.037 | −3.3 | −2.6 | −9.0 |
| | | 0.046 | −4.5 | −7.5 | −8.5 |
| | | Unshocked Side | | | |
| | | 0.000 | −11.8 | −9.9 | |
| | | 0.002 | −18.7 | −12.8 | |
| | | 0.007 | −13.3 | −8.7 | |
| | | 0.018 | −10.3 | −15.9 | |

The residual stresses in Table 3 above for shocking one side only without a momentum trap are quite different from sample MT-RS1 (Table 2) utilizing the momentum trap and shocking one side at a time. The surface stresses on the irradiated surface of the shocked one side only specimen are compressive but about as low as the unshocked material. The lower residual stress at the center of the laser shocked zone (G) compared to those away from the center (H and I) is consistent with results for other split beam processing.

The back side results are somewhat surprising. The residual stresses are compressive, at levels higher than the shocked surface, and are maximum at 0.002 inch below the surface before decreasing at greater depths. It is not understood why the residual stresses at the back surface are compressive and not tensile.

From the momentum trap results, it is clear that the shocked side on the one-sided specimen had a significant residual compressive stress profile, after the intiial shock wave had passed through the specimen. However, instead of passing out of the specimen and being carried away as in the momentum trap specimen (MT-RS1), the shock wave reflected from the unsupported back surface, producing the residual stress profile visible at the rear surface. The maximum in the subsurface residual stress at the back surface may be related to the depth at which the maximum tensile stress amplitude of the reflected wave was reached.

The residual stress profile can be modified somewhat by varying the laser process conditions: the number of laser shots on the same area. With each successive pulse, additional plastic deformation occurs within the metal substrate. The stress profile resulting from a single shot decreases rather steeply with distance from the front surface, while a specimen treated with multiple shots has a rather constant profile down to about 0.005 inches, and then drops off steeply, maintaining higher compressive stresses throughout as compared to the single shot condition. When multiple pulses are used with a layer of paint, the substrate surface must be repainted prior to each pulse. Also, the hardness continues to increase by increasing the number of shots. Some harder materials that are not responsive to one shot may be treated with multiple shots on the fatigue critical area.

Fatigue Testing

Four specimens were prepared and laser shock-processed under conditions indicated in the Table 4. All specimens were processed with fused quartz overlays. Specimens SB-1A and SB-2A were processed with split beam geometry, whereas specimens MT-7A and MT-8A were processed using a momentum trap, involving two separate one-sided irradiations.

TABLE 4

LASER SHOCK PROCESSING PARAMETERS FOR ALUMINUM 2024-T351 FATIGUE SPECIMENS

| Sample Number | Hole Diameter, cm | Beam Diameter, cm | Average Fluence, J/cm$^2$ | | Pulse Width, ns | Peak Power Density 10$^9$ W/cm$^2$ | |
|---|---|---|---|---|---|---|---|
| | | | Side 1 | Side 2 | | Side 1 | Side 2 |
| SB-1A | 0.48 | 1.63 | 81 | 80 | ~15 | ~5.4 | ~5.3 |
| SB-2A | 0.48 | 1.63 | 75 | 75 | 15 | 5.0 | 5.0 |
| MT-7A | 0.48 | 1.63 | 85 | 86 | ~23.5 | 3.7 | 3.6 |
| MT-8A | 0.48 | 1.63 | 91 | 87 | 20 | 4.6 | 4.4 |

Two additional unshocked specimens (US-1 and US-2) were analyzed for baseline comparisons. All tests were conducted at 15 ksi maximum cross section stress amplitude, and a stress ratio of 0.1. The following table compares fatigue strength of the various samples:

TABLE 5

| Specimen Number | Laser Shock Condition | Cycles to Failure | Improvement Factors |
|---|---|---|---|
| US-1 | Unshocked | 50,500 | 1 |
| US-2 | Unshocked | 49,800 | 1 |
| SB-1A | Split beam-solid spot | 2,020,000 | 40.3 |
| SB-2A | Split beam-solid spot | 1,340,000 | 26.7 |
| MT-7A | Momentum trap | 720,190 | 14.4 |
| MT-8A | Momentum trap | 731,150 | 14.6 |

Hence, the use of the momentum trap improves the fatigue life of the specimen by more than 14 times, when compared to an unshocked specimen, and is nearly as effective as the split beam method.

Fastener Joints

Laser shock processing is also a viable tool for improving the fatigue performance of mechanically fastened joints (see "Investigation of Laser Shock Processing", AFWAL-TR-80-3001, Vols. I and II, Battelle Columbus Laboratories, Aug. 1980, S. C. Ford, B. P. Fairand, A. H. Clauer, and R. D. Galliher, the disclosure of which is incorporated by reference herein). The report investigated residual stresses caused by laser shock processing of 7075 and 2024 aluminum alloys. Material properties investigated involved fatigue life, which consists of cycles to crack initiation rate and cycles for crack propagation rate where the material surrounding a hole was treated by laser shock processing.

Although all of the fastener holes that have been studied are round, it is believed that the principles disclosed herein are equally applicable to fastener holes having a broad range of other geometries.

Although the fatigue life was lengthened and the crack propagation rate was slowed by the processing, it was observed that crack initiation occurred much earlier in the shocked specimens. Since all fastener joint processing utilized split beam geometry, the crack initiation occurred at the surface of the hole in the mid-thickness region. After initiation the crack tunnels through the laser shocked zone for some distance before breaking through to the surface. Crack growth is significantly retarded because it must travel through a high compressure residual stress zone, which explains the improved fatigue life.

It appears that the crack initiation rate may be increased by the concentration of residual tensile stresses at the hole surface and in the mid-thickness region dimension surrounding the hole. If the crack initiation rate can be diminished, fatigue life would drastically improve.

One method to inhibit crack initiation involves laser shock processing the cylindrical wall of the fastener hole to create compressive stresses therein. The method utilizes a material having a reflective surface of optical quality, that is inserted and secured inside the hole. The material is preferably a conical reflective surface. When the laser shock is directed into the fastener hole, the reflective surface reflects the pulse onto the cylindrical wall defining the fastener hole, thereby providing a more uniform residual stress profile in this surrounding material. It is believed that the crack initiation rate in this strengthened material wall will be appreciably lowered as compared with an unshocked fastener hole specimen, or a specimen laser shocked without the reflective surfaces. By using a momentum trap with the reflective surface the front surface can be treated at the same time as the cylindrical wall defining the hole.

Another method involves the use of a different beam geometry in laser shock processing. By shocking a concentric annular region around a fastener hole, with the inside diameter of the laser shocked region somewhat larger than the hole diameter, the region immediately around the hole remains unshocked. The use of an annular shock region allows the crack to initiate in the hole wall and grow similar to an unshocked specimen, but the crack in the unshocked portion will grow until it encounters the annular region of residual stress which will slow the crack propagation rate.

Preliminary data indicates that even in the unshocked region around the hole, there is an increase in the compressive residual stresses. The magnitude of the residual stress rises to a maximum across the laser shocked region. Immediately outside the laser shocked zone, a residual tensile stress compensates for the compressive stress.

Although the present invention has been specifically disclosed with preferred embodiments, many other forms of the invention are possible. It is not intended herein to mention all possible forms of the invention, and the terms used are descriptive rather than limiting. Accordingly, the scope of this invention is intended to be limited only by the scope of the appended claims.

We claim:

1. A method of altering the properties of a metal substrate having opposed, front and back surfaces by a process of laser shocking wherein a transparent overlay material is placed in direct contact with the front surface, at least one high-pressure laser pulse is focused on the front surface imparting a high amplitude stress wave in the metal substrate traveling from the front surface to the back surface thereof wherein the improvement comprises detachably affixing a momentum trap of a material having substantially the same acoustical impedance as the metal substrate in direct contact with the back surface of the metal substrate in such a manner that the high amplitude stress wave is substantially transmitted into the momentum trap and imparts force therein to detach the momentum trap from the metal substrate before being reflected back into the metal substrate.

* * * * *